(12) United States Patent
Keesman

(10) Patent No.: US 6,944,221 B1
(45) Date of Patent: Sep. 13, 2005

(54) BUFFER MANAGEMENT IN VARIABLE BIT-RATE COMPRESSION SYSTEMS

(75) Inventor: Gerrit J. Keesman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1263 days.

(21) Appl. No.: 08/901,338

(22) Filed: Jul. 28, 1997

Related U.S. Application Data

(63) Continuation of application No. 08/366,339, filed on Dec. 28, 1994, now abandoned.

(51) Int. Cl.[7] .................................................. H04N 7/18
(52) U.S. Cl. ......................... 375/240.02; 375/240.03; 375/240.04
(58) Field of Search .................. 348/415, 416, 348/419, 420, 390, 398, 387, 461, 463, 432, 431, 384, 405, 409, 423; 375/240.01–240.29

(56) References Cited

U.S. PATENT DOCUMENTS

| | | | | | |
|---|---|---|---|---|---|
| 5,038,209 | A | * | 8/1991 | Hang | 348/416 |
| 5,122,874 | A | * | 6/1992 | Lhuillier et al. | 348/416 |
| 5,134,476 | A | * | 7/1992 | Aravind et al. | 358/133 |
| 5,159,447 | A | * | 10/1992 | Haskell et al. | 348/419 |
| 5,231,492 | A | * | 7/1993 | Dangi et al. | 358/143 |
| 5,241,383 | A | * | 8/1993 | Chen et al. | 358/136 |
| 5,287,182 | A | * | 2/1994 | Haskell et al. | 348/500 |
| 5,317,396 | A | * | 5/1994 | Fujinami | 348/387 |
| 5,402,176 | A | * | 3/1995 | Murakami | 348/416 |
| 5,410,355 | A | * | 4/1995 | Kolczynski | 348/438 |
| 5,416,521 | A | * | 5/1995 | Chujoh et al. | 348/411 |
| 5,426,463 | A | * | 6/1995 | Reininger et al. | 348/415 |
| 5,461,619 | A | * | 10/1995 | Citta et al. | 348/423 |
| 5,506,844 | A | * | 4/1996 | Rao | 370/84 |
| 5,534,929 | A | * | 7/1996 | Tanaka | 348/405 |
| 5,534,944 | A | * | 7/1996 | Egawa et al. | 348/432 |
| 5,537,446 | A | * | 7/1996 | Lakshman et al. | 375/371 |
| 5,541,852 | A | * | 7/1996 | Eyboglu et al. | 364/514 |
| 5,561,466 | A | * | 10/1996 | Kiriyama | 348/423 |
| 5,566,208 | A | * | 10/1996 | Balakrishnan | 375/240 |
| 5,606,369 | A | | 2/1997 | Keesman et al. | |
| 5,606,539 | A | * | 2/1997 | De Haan et al. | 348/419 |
| 5,617,145 | A | * | 4/1997 | Huang et al. | 348/423 |
| 5,621,820 | A | * | 4/1997 | Rynderman et al. | 348/419 |

FOREIGN PATENT DOCUMENTS

| | | | |
|---|---|---|---|
| EP | A2-0660612 | * | 6/1995 |
| EP | A2-0664651 | * | 7/1995 |

OTHER PUBLICATIONS

"Constraints on Variable Bit–Rate Video for ATM Networks", Amy R. Reibman and Barry G. Haskell, IEEE Transactions on Circuits and Systems for Video Technology, vol. 2, No. 4, Dec. 1992, pp. 361–372.

* cited by examiner

*Primary Examiner*—Andy Rao

(57) ABSTRACT

A method of compression is provided for transmission of digital video signals between an encoder buffer and a decoder buffer. A tunable delay is provided at the encoder, suitably in the form of a portion of encoder buffer memory, with data being read out to a communications channel at a rate determined by the input bit rate of signals received a predetermined number of frame periods later. Use of the tunable delay improves efficiency of decoder buffering by maintaining a relatively constant level of decoder buffer fullness irrespective of signal bit rates.

13 Claims, 2 Drawing Sheets

BUFFER MANAGEMENT IN VARIABLE BIT-RATE COMPRESSION SYSTEMS

This is a continuation of application Ser. No. 08/366,339, filed Dec. 28, 1994 now abandoned.

BACKGROUND OF THE INVENTION

The present invention relates to a method and apparatus for the compression of digital video signals and in particular to the use of such method and apparatus in the encoding and decoding of signals.

Variable bit rate (VBR) video compression is known to give advantages over constant bit-rate (CBR) video compression. The main reason for this is that in a CBR system the bit rate has to be set so that the worst case quality is acceptable while in a VBR system the bit rate is set so that the average quality (which is kept constant) is acceptable. The difference between the average bit rate of a VBR compressed signal compared to the bit rate of a CBR compressed signal has been found to be to be close to 30% in favour of VBR compression.

Though VBR compression is better than CBR, it can only be used in a limited number of applications. In principle the medium should be able to convey variable bit-rate signals. In terms of the ISO/OSI model, almost every medium conveys a fixed bit rate at the physical layer. On a higher level, the medium can be converted into a (logically) variable bit rate medium.

One particular application of VBR compression is joint bit-rate control, in which a number of sources make use of a single channel. In the case of joint bit-rate control the bit-rate of the video signals is controlled such that the individual bit rates can be varying (through optimal allocation of bit rate) but so that the sum of all bit rates is constant. This type of system may occur in for instance cable television or in satellite television services.

The idea of joint bit-rate control for multi-program video signal encoding has been found to be advantageous, particularly for video signals coded according to the ISO MPEG standards. Basically a system for joint bit-rate control needs technical measures for two problems, namely the bit allocation and the buffer management. To deal with bit allocation, the bit need of the programs is measured and the bits are spread accordingly over the programs. Buffer management encompasses several sub-problems, some of which are described in "Constraints on variable bit-rate video for ATM-networks" by Amy Reibman and Barry Haskell; in IEEE Transactions on Circuits and Systems for Video Technology, Vol 2, No. 4 December 1992 pp. 361–372. The Reibman and Haskell paper examines the constraints resulting from encoder and decoder buffering in an asynchronous transfer mode (ATM) network, in particular the additional constraints needed to prevent overflowing or underflowing of the decoder buffer when a variable bit-rate data channel links encoder and decoder. They describe a method in which the number of encoded bits for each video frame and the number of bits transmitted across the variable bit-rate channel are selected jointly, a necessity imposed by the differing constraints imposed on the transmitted bit rate by the encoder and decoder buffers respectively.

In all these applications the transmission of video can be in the MPEG format. An MPEG decoder contains a physical buffer, and correct MPEG bit streams must fulfil the video buffering verifier (VBV) constraints, which means that the signals may not overflow or underflow a hypothetical decoder buffer. As will be shown hereinafter, an incorrect buffer management may limit the performance of a VBR compression system. The analyses of buffering systems rely strongly on the concept of a system delay whereby, in order to have a continuous display of video, the system delay must be constant. This requirement has an effect on the buffering strategy.

For CBR systems, given a fixed decoder buffer size, the delay must be relatively large for a low bit-rate and relatively low for a high bit-rate in order to make full use of the available buffering space in the decoder. If the bit rate is variable a compromise setting of the buffering system must be used. As a consequence of this compromise the effective buffer size in the decoder is too low for an acceptable performance at low bit rates. Essentially, two things are required, namely a constant end-to-end delay, and a low buffering delay for high bit rates and a high buffering delay for low bit rates. These requirements would appear to be incompatible.

It is an object of the present invention to provide improved stability of decoder buffer operation.

It is a further object of the present invention to provide greater efficiency in encoder buffer management.

SUMMARY OF THE INVENTION

In accordance with the present invention there is provided a method of compression for transmission of encoded digital video signals having a variable number of data bits per image frame, comprising the steps of:

a) detecting a first bit rate of the encoded digital video signal bit stream;

b) sequentially writing the signal bit stream into a buffer at the first bit rate;

c) deriving a second bit rate as a percentage of the first bit rate, changes are which percentage are inversely relation to changes in the first bit rate;

d) reading the bit stream out of the buffer at the second bit rate.

By the provision of the "tunable delay" resulting from the varied output and input bit rates in the encoder buffer, the contents of the nominal decoder buffer will remain substantially constant. The relationship between input and output rates means that at high input signal bit rates, where the remainder of the buffering system (provided by the encoder stage and the decoder) provides a relatively low delay, the tunable delay provides a relatively high delay. At low input signal bit rates, the tunable delay is reduced to counter the relatively higher delay introduced by the remainder of the buffering system.

The range of possible input bit rates may suitably be divided into discrete levels with a derived second bit rate being maintained constant until an input signal bit rate within a different one of the levels is detected at which point the second bit rate is recalculated. For a minimum input bit rate, the second bit rate is suitably set to equal that bit rate: in other words, at minimum input bit rate, the delay is set to zero.

Successive groupings of one or more image frames may be specified with the second bit rate being derived from the first frame of the grouping and maintained constant until the bit rate of the first frame of a succeeding grouping is detected. The groupings may be determined on the basis of successive frames within a range of bit rates as mentioned above or may be specified on other criteria. For signals encoded according to the MPEG standard, a first grouping may be specified for I-pictures, with one or more other groupings for other types of image.

Also in accordance with the present invention there is provided a video signal encoding apparatus operable to encode a digital video signal for transmission, the apparatus comprising an encoder stage operable to encode a received video signal according to a predetermined coding scheme and to output the signal as a variable bit-rate data stream and a buffer coupled to receive the said variable bit-rate data stream from the encoder and arranged to output a data signal for transmission; characterised by means operable to detect the bit-rate of the said variable bit-rate data stream, to derive a second bit rate as a percentage of the encoder stage output bit rate, which percentage changes in inverse relation to changes in the encoder stage output rate, and to control the buffer output data signal bit rate at the said second bit rate.

Further in accordance with the present invention there is provided an encoded video signal compressed (for transmission) by the method recited above. The signal, comprising a bit stream of encoded data for a succession of image frames, has its instantaneous bit rate inversely related to the bit density of an image frame n frame periods later where n is determined by the said bit density. As will be understood, the bit rate of the uncompressed signal is determined by the bit density, and the n frame periods (where n is not necessarily an integer) corresponds to the lag introduced by the tunable delay.

Preferred embodiments of the present invention will now be described, by way of example only, and with reference to the accompanying drawings in which:

FIG. 1 schematically represents a series of image frames coded according to the MPEG standard;

Figure 3:
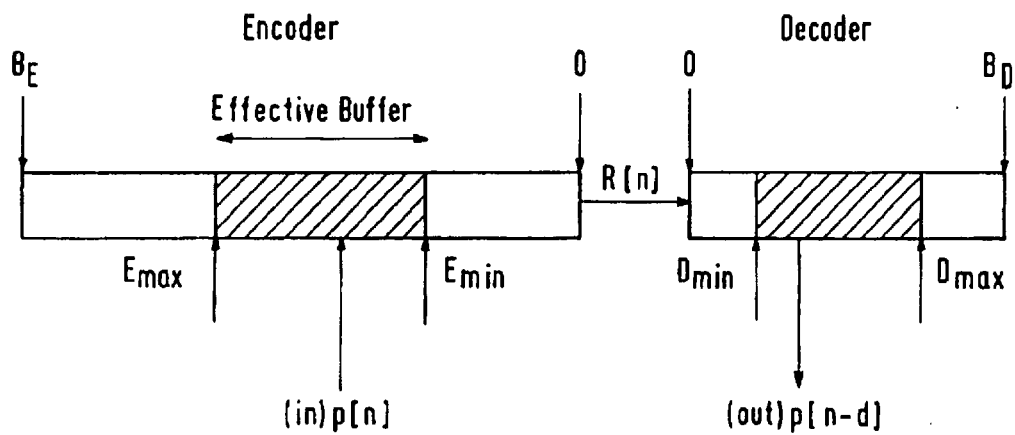
FIG. 3 represents usage of the encoder buffer of the apparatus of FIG. 2 in relation to decoder buffer usage.
Figure 4:
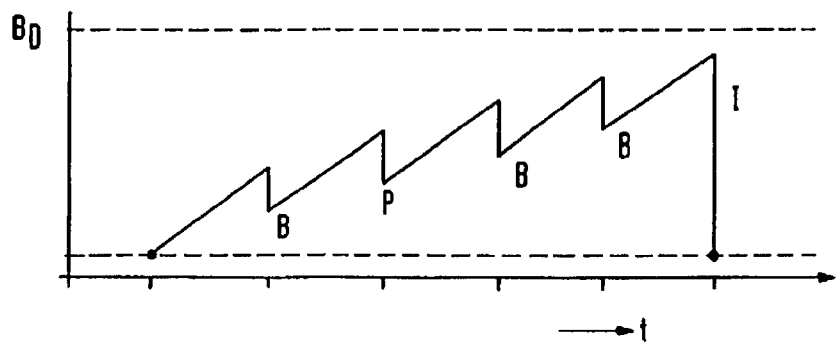
Figure 5:
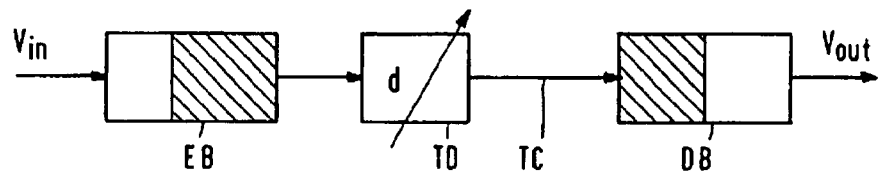
Figure 6:
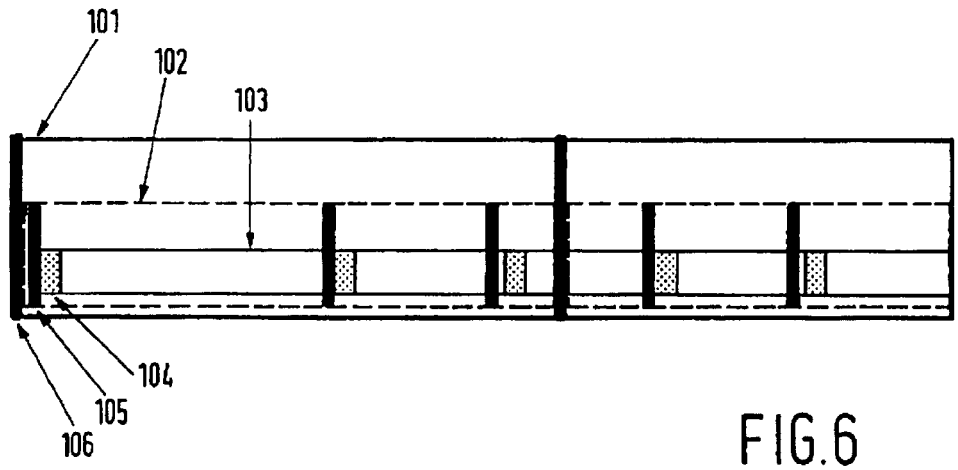
Figure 7:
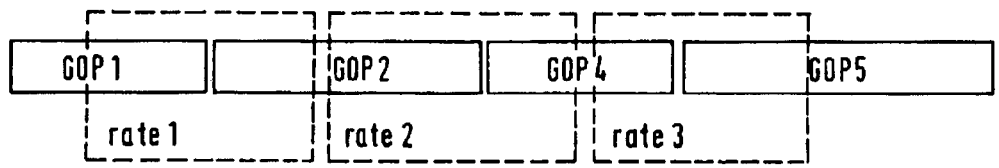

FIG. 4 graphically represents increase in decoder buffer fullness over time;

FIG. 5 represents a modified version of FIG. 3 embodying the present invention;

FIG. 6 schematically illustrates the combination of video and MPEG program streams; and FIG. 7 represents skew resulting from bit-rate changes.

DETAILED DESCRIPTION OF THE PREFERRED EMBODIMENT

The following description is concerned with the management of MPEG-coded video signals by way of example, although it will be readily appreciated by the skilled practitioner that the invention is not restricted to such coding standards.

The MPEG standard describes a syntax and semantics of bit streams for compressed video and associated audio. Whilst the semantics in principle specify the functionality of the decoder, the standard provides no prescriptions for the decoder architecture. Each decoder will have an input buffer of some sort but how this is to be realized and what exact size this buffer must have is not specified.

Figure 1:
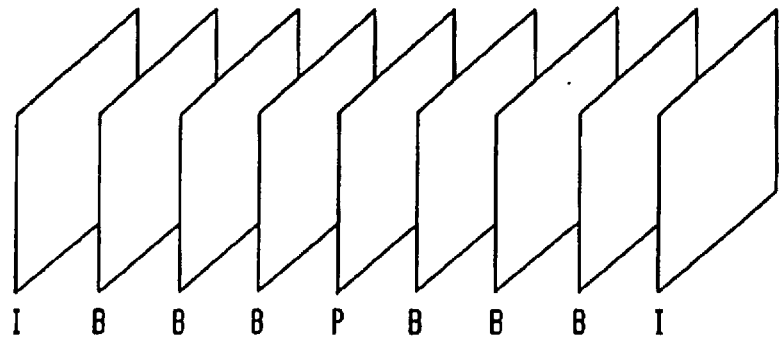

Recognising the importance of random access for stored video and the significant bit-rate reduction that may be obtained through motion-compensated interpolation, the MPEG standard recognises three types of pictures (frames) namely intra-pictures, predicted pictures and interpolated pictures, generally referred to as I, P, and B-pictures respectively. I-pictures provide access points for random pictures and accordingly have only limited compression. P-pictures are coded with reference to a past (I or P) picture and often form a reference for future P-pictures. B-pictures have the highest degree of compression but require both a past and future reference for prediction. A typical MPEG sequence of I, P and B-pictures is shown in FIG. 1.

Figure 2:
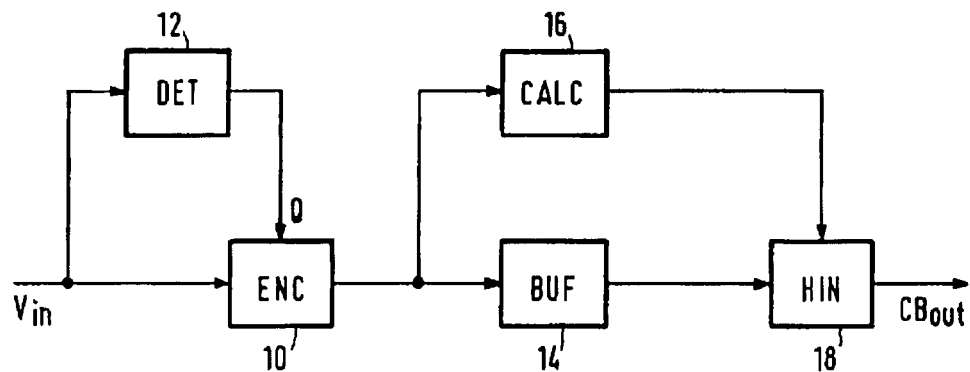
FIG. 2 is a block diagram of part of an encoder apparatus embodying the invention.

A schematic representation of an MPEG encoder is shown in FIG. 2. A received video signal is passed to encoder stage 10 together with a control signal which varies the quantisation coarseness of the encoding. In many cases (although not for joint bit rate encoding) the control signal is kept constant to maintain coarseness at the same average level. The control signal is derived on the basis of the incoming video signal by detector 12. The output of the encoder stage 10 is passed to an encoder buffer 14 at a first bit rate and also to a calculation unit 16. The calculation unit 16 derives a value for a second bit rate and passes this to a header insertion stage 18 which reads the signal bit stream out of the buffer at the second bit rate and places the bit stream on a communication channel for transmission to a receiver/decoder. The basis of the calculations performed by unit 16 to derive an appropriate second bit rate will now be described in terms of a theoretical encoder/decoder buffer arrangement.

The MPEG standard constrains bit streams such that they may not overflow or underflow a hypothetical buffer: this hypothetical buffer can be related to the physical buffers appearing in the signal encoder and decoder stages.

In studies of buffer management problems, analysis of the combination of the encoder buffer and the decoder buffer uses a model of the two buffers as shown in FIG. 3: this model will be used to explain the problem that occurs in a variable bit-rate situation.

The MPEG standard is partitioned in three parts: the video part, the audio part and the systems part. The video part contains a mechanism called the VBV and the systems part contains a part called the transport system target decoder (T-STD). MPEG decoders are realisable because the signal (bitstream) has to fulfil certain conditions, and bitstreams that fulfil the VBV condition (or similar for T-STD) are said to be compliant. Since bitstreams must fulfil the VBV condition it is possible to design decoders that can decode compliant bitstreams.

The VBV definition is based on a hypothetical decoder which reads the compressed pictures in zero time from the VBV buffer and a channel that continuously fills up the buffer. FIG. 4 shows characteristic VBV buffer contents as a function of time for a part of the MPEG frame sequence of FIG. 1. The VBV is specifically defined for constant bit-rate operation. In case of variable bit-rate operation, the MPEG standard specifies that the definition of the VBV buffer is overruled by the definition of the T-STD.

The bitstream is written into the buffer at the bit-rate specified in the sequence header. The bitstream contains information about the contents of the VBV buffer. This information is presented in a field in each picture header called the VBV delay, which specifies the time between the moment that the header enters the VBV buffer and the moment of decoding the picture.

In the systems part of the MPEG standard, mechanisms are defined that provide means to synchronise the decoder. These mechanisms are called the decoding time stamp (DTS) and the presentation time stamp (PTS) which are measured in time units. The mechanism of system clock reference (SCR) is used to recover the correct time. The complete decoding operation is described again in terms of a hypothetical decoder which is referred to as the standard target decoder (STD). The systems part describes two types of systems layer: the transport stream and the program stream. The STD for the transport stream is referred to as T-STD and for the program stream the term P-STD is used. In the following the difference between these streams is explained.

In principle the program stream is defined for applications which have a very low error probability such as optical recording. The basic characteristic of the program stream is that it can convey only one program and that the bit-rate can be varying: as such it may be of limited general use. Of greater utility is the transport stream, which is intended for multi-program environments. The bit-rate for each program is allowed to vary but the sum of all bit-rates must be constant. The transport stream uses a fixed size packets of 188 bytes. The T-STD can be used for HD-CD (VBR optical medium) by reading a variable bit-rate from the disk and adding an artificial empty program to the bitstream in passing the information from the reader on to the decoder such that the total bit-rate is constant. The definition of the functionality of both the P-STD and the T-STD is similar.

We have recognised that a problem in conventional buffer-management is that the available buffer space in the decoder depends on the bit rate. At low bit rate we have too small an effective decoder buffer capacity available, which will hamper the image quality.

Referring back now to the model of FIG. 3, the buffering model uses the following parameters the (discrete) time n the current bit rate R[n] of readout from the encoder buffer the input-output delay d physical encoder buffer size $B_E$ physical decoder buffer size $B_D$ encoder buffer pointer E[n]

decoder buffer pointer D[n]

range of decoder buffer pointer $D_{min}[n] \leq D[n] < D_{max}[n]$ range of encoder buffer pointer $E_{min}[n] \leq E[n] < E_{max}[n]$ It will be noted that the range of the buffer pointers is introduced as a separate variable which is time dependent, with the current buffer pointers E[n] and D[n] representing the buffer contents. A key variable in the buffer system is the input-output delay d which denotes the time between inputting a picture to the encoder and the time that this picture is decoded by the decoder. In the following derivations, we assume d to be an integer number of pictures, although non-integer values are possible as well. This variable is necessarily constant over the entire sequence since otherwise a non-continuous display would result, affecting motion portrayal.

We assume that the buffers are operated in the following way $$E[n]=E[n-1]-R[n]+p[n]$$

$$D[n]=D[n-1]+R[n]-p[n-d] \quad \text{(Equation 1)}$$

In this model we assume an action (next n) every new picture. From this buffer behaviour model the following relation between the encoder buffer contents and the decoder buffer contents can be derived $$D[n]+E[n-d] = \sum_{i=n-d+1}^{n} R[i] \quad \text{(Equation 2)}$$

From Equation 2 we can derive relation between the boundaries of the buffer contents which yields $$D_{\max}[n] = \sum_{i=n-d+1}^{n} R[i] - E_{\min}[n-d] \quad \text{(Equation 3)}$$

$$D_{\min}[n] = \sum_{i=n-d+1}^{n} R[i] - E_{\max}[n-d]$$

This equation shows that underflow in the encoder is linked to overflow in the decoder and vice versa; the encoder buffer and decoder buffer have dual behaviour. Clearly, there is a lag of d samples between encoder and decoder constraints.

A common choice (that is made in the Reibman and Haskell paper mentioned previously) is to select:

$$D_{min}[n]=E_{min}[n-d]=0 \quad \text{(Equation 4)}$$

This choice means that underflow in either of the two buffers is in fact a physical underflow and, hence, a loss of data. Underflow in the encoder means the following violation on the decoder side of $$D[n] > D_{max}[n] \quad \text{(Equation 5)}$$

with $$D_{\max}[n] = + \sum_{i=n-d+1}^{n} R[i] \quad \text{(Equation 6)}$$

Hence the maximum available buffer space in the decoder depends on the (integrated) bit rate over the past d samples. This may lead to problems if, for instance, the bit rate is constant over more than d samples. In such a situation we have $$D_{max}[n]=d \cdot R \quad \text{(Equation 7)}$$

hence at a low bit-rate we have a small effective decoder buffer available. At a low bit-rate we still may have relatively large I-pictures, which can happen for scenes with high detail and absolutely no motion. Since the available buffer space is small, it is a conventional technique to reduce the quality of that I-picture such that the buffer constraint in Equation 5 is not violated.

Our solution to this problem is to have a small delay, as shown in FIG. 5 and also to use a relatively high bit-rate for the I-picture. The small delay averages out over a small number of pictures, and hence a small bit-rate peak will help. The special treatment of I-pictures means that over a series of pictures such as the sequence of FIG. 1, we use two bit-rates; a relatively high one for the period of time containing the I-pictures and a lower one for the other classes of pictures. This provides us with higher peak bit-rates. For the sequence of FIG. 1, we therefore have three groups of pictures (GOP's), one for each of the I-pictures and one for the GOP of P- and B-pictures between them, with the bit-rate remaining constant (either high or low) in each GOP. If desired, a third bit-rate (between the relatively high and relatively low levels) may be specified for P-pictures in which case the sequence of FIG. 1 would comprise five GOP with the bit-rate following the pattern of high-low-medium-low-high over the series.

The use of this specified bit-rate technique in the encoder may be detected from the decoder by testing Equation 5 on the bit stream. If the equation yields an "overflow" it shows the technique to have been used.

The choices for our larger encoder buffer and appropriate bit-rate over time will now be described. The conventional choice made in Equation 4 is the source for existing problems: we have appreciated that by making an alternative choice more flexibility in the decoder is provided. We choose $$D_{min}=0$$

$$D_{max}=B_D \quad \text{(Equation 8)}$$

which may be considered as an advance selection of the largest possible decoder buffer. As will be shown, this choice leads to a larger encoder buffer. Note that an alternative choice for the buffer, such as $$D_{max}[n] = A + B \cdot \left( \sum_{i=n-d+1}^{n} R[i] \right) \quad \text{(Equation 9)}$$

will yield similar conclusions for the encoder buffer, unless A=0, B=1 (which is the case in the original problem).

Substituting the choices from Equation 8 in Equation 3 yields $$E_{min}[n-d] = \sum_{i=n-d+1}^{n} R[i] - B_D \quad \text{(Equation 10)}$$

and $$E_{max}[n-d] = \sum_{i=n-d+1}^{n} R[i] \quad \text{(Equation 11)}$$

These equations show that the lower limit of the encoder buffer contents is non-zero which means that the encoder buffer must be larger than is conventional. In fact the physical size of the encoder buffer equals that of the decoder buffer plus some margin. The margin is calculated from the maximum and minimum bit rate on the channel as will be demonstrated below.

Considering Equation 10 for our analysis, analysis of the extremal values of $E_{min}$ yields insight in important system characteristics. One end of the scale is reached when $E_{min}=0$. This situation will occur if we transmit for more than d symbols at the minimum bit rate. Substituting these assumptions in Equation 10 yields $$B_D = d \cdot R_{min} \quad \text{(Equation 12)}$$

Thus we use the minimum bit rate to select the required delay. It is appreciated that this delay will generally be larger than in the conventional situation, but the actual value remains acceptable, especially in the case of recording applications.

At the other end of the scale we find the required extra buffer size by considering that the encoder buffer size can be written as $$B_E = B_D + \text{margin} \quad \text{(Equation 13)}$$

where the margin is equal to the maximum value of $E_{min}$. The maximum value is reached if the bit rate is at its maximum value for more than d samples (pictures). In this case we find $$\text{margin} = d \cdot R_{max} = B_D \cdot \frac{R_{max}}{R_{min}} \quad \text{(Equation 14)}$$

Turning now to the calculation of the time dependent bit rate R[n], the decoder buffer content is required to be the same at the beginning and at the end of a GOP. FIG. 4 illustrates this condition using the decoder buffer fullness.

From Equation 1 it can be seen that this condition means $$\sum_{i=n-d+1}^{n} p[i-d] = \sum_{i=n-d+1}^{n} R[i] \quad \text{(Equation 15)}$$

and keeping the bit rate R[i]=R constant over a GOP of length N pictures we have $$\sum_{i=n-d+1}^{n} p[i-d] = N \cdot R \quad \text{(Equation 16)}$$

From Equation 15 it will be appreciated that the channel bit rate has to change d samples after the source bit rate has changed and also that the bit rate will generally have to be changed within a picture, rather than at the header of a picture, although this may occasionally occur. The bit rate changes are shown in terms of the MPEG syntax in FIG. 6.

The MPEG transport stream is meant for multi-program environments and the program stream is meant for environments with one program, like optical recording. FIG. 6 shows how a video bit stream can be wrapped in a program stream. In the program stream we have the MPEG concepts PACK-headers and PES-headers (PES-packetized elementary stream). The PACK-header contains information on the elementary stream rate (=ES-rate). Since PACK-headers are not necessarily constrained to precede picture-headers or PES-headers we are allowed to change the bit rate at any moment.

The consequences of Equation 15 and Equation 16 are shown in FIG. 7 which shows the skew between moment of inputting the groups of pictures to the buffer and the moment of changing the bit rate: the continuous lines represent the time interval in which the bits resulting from compressing a GOP are written into the buffer, and the dashed lines indicate the time interval for which the output bit rate calculated for that GOP is applied.

In the foregoing, we have shown an enhanced buffer management strategy that does not put constraints on the quality of compression, for only a small extra delay.

From reading the present disclosure, other modifications will be apparent to persons skilled in the art. Such modifications may involve other features which are already known in the design, manufacture and use of digital video signal encoding and decoding systems and devices and component parts thereof and which may be used instead of or in addition to features already described herein.

What is claimed is:

1. A method of compression for transmission of encoded digital video signals having a variable number of data bits per image frame, comprising the steps of:
    a) detecting a first bit rate of an encoded digital video signal bit stream;
    b) sequentially writing the encoded digital video signal bit stream in an encoder buffer at the first bit rate;
    c) deriving a second bit rate as a percentage of the first bit rate, which percentage changes inversely in relation to changes in the first bit rate; and
    d) reading the encoded digital video bit stream out of the encoder buffer at the second bit rate; and transmitting the encoded digital video bit stream to a decoder buffer at the second bit rate.

2. A method as claimed in claim 1, wherein for a specified range of first bit rates, the second bit rate equals the minimum first bit rate in said range.

3. A method as claimed in claim 1, wherein successive groupings of one or more image frames are specified, and the second bit rate is derived from a bit rate of the first frame of the grouping and maintained constant until the bit rate of a first frame of a succeeding grouping is detected.

4. A method as claimed in claim 3, wherein for signals encoded according to the MPEG standard, a first grouping is assigned to I-pictures and a second grouping is assigned to other types of images.

5. A video signal encoding apparatus for encoding a received digital video signal for transmission, the apparatus comprising:
   an encoder stage for encoding a received video signal according to a predetermined coding algorithm and producing the encoded video signal as a variable bit-rate data stream at an output of said encoder stage;
   a buffer coupled to receive said variable bit-rate data stream from the encoder stage and arranged to output a data signal corresponding thereto for transmission; and
   means coupled to said encoder stage to (i) detect the bit-rate of said variable bit-rate data stream, (ii) derive a second bit rate as a percentage of the detected bit-rate, which percentage changes in inverse relation to changes in the detected bit rate, (iii) control said buffer to produce said output data signal at second bit rate, and (iv) transmit the output data signal to a decoder buffer at the second bit rate; wherein the detected bit rate and said second bit rate are variable.

6. Apparatus according to claim 5, wherein the encoder stage is configured to encode the received video signal in accordance with the MPEG standard.

7. Apparatus according to claim 5, wherein said means for detecting a bit rate stores a plurality of contiguous ranges of bit rate values and, on first detecting an encoder output bit rate falling within a first of said ranges, maintains the derived second bit rate substantially constant until a detected encoder output bit rate falls with another of said ranges.

8. A method as claimed in claim 1, wherein an instantaneous bit rate of an image frame of the encoded digital video signal bit stream is inversely related to a bit density of an image frame of said bit stream n frame periods later, where n is determined by said bit density.

9. A method as claimed in claim 2, wherein successive groupings of one or more image frames are specified, and the second bit rate is derived from a bit rate of the first frame of the grouping and maintained constant until the bit rate of a first frame of a succeeding grouping is detected.

10. The method as claimed in claim 1, wherein the step of deriving the second bit rate is carried out by changing the percentage of the first bit rate in response to changes in the first bit rate in such a manner as to maintain a substantially constant fullness level of the buffer.

11. The apparatus as claimed in claim 5, wherein the means coupled to said encoder stage derives the second bit rate by changing the percentage of the first bit rate in response to changes in the first bit rate in such a manner as to maintain a substantially constant fullness level of said buffer.

12. A method of compression for transmission of an encoded digital bit stream having a variable bit rate, comprising the steps of:
   detecting a current bit rate of the encoded digital bit stream;
   sequentially writing the encoded digital bit stream into a buffer at the detected current bit rate;
   reading the encoded digital bit stream out of the buffer at a buffer read bit rate; and,
   varying the buffer read bit rate in such a manner as to maintain a substantially constant fullness level of the buffer in response to changes in the detected current bit rate, wherein the buffer read bit rate is a percentage of the detected current bit rate, which percentage varies inversely in relation to changes in the detected current bit rate.

13. The method as set forth in claim 12, wherein a delay between the input and output of the buffer varies as a function of the detected current bit rate, so that the delay is relatively higher for a detected current bit rate which is higher than a prescribed bit rate and is relatively lower for a detected current bit rate which is lower than the prescribed bit rate.

* * * * *